Aug. 16, 1932.  B. E. LENEHAN  1,871,710
METERING SYSTEM
Filed April 11, 1929
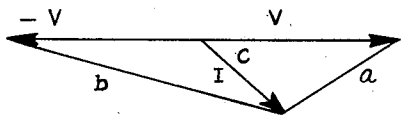
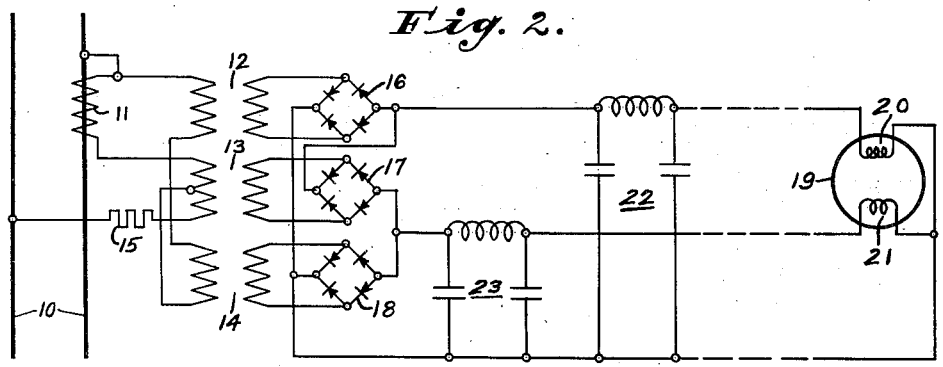
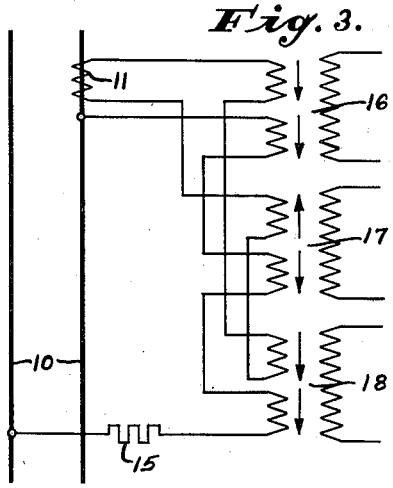
INVENTOR
Bernard E. Lenehan
BY
ATTORNEY Patented Aug. 16, 1932

1,871,710

UNITED STATES PATENT OFFICE

BERNARD E. LENEHAN, OF BLOOMFIELD, NEW JERSEY, ASSIGNOR TO WESTINGHOUSE ELECTRIC & MANUFACTURING COMPANY, A CORPORATION OF PENNSYLVANIA

METERING SYSTEM

Application filed April 11, 1929. Serial No. 354,301.

My invention pertains to metering systems and, in particular, to metering systems of the type designed to provide an indication of the magnitude of the power supplied to a load circuit or other function or characteristic thereof at a distant point.

An object of my invention is to provide a system of the type described which affords an immediate indication of changes in the magnitude of the load on the distant circuit or other function thereof.

Another object of my invention is to utilize standard indicating instruments in connection with a remote-metering system.

Further objects of my invention will become apparent as the description thereof proceeds.

In accordance with my invention, I propose to multiply the sum and difference of the vector sum and vector difference of the current and voltage characteristic of a load circuit and thus obtain a measure of the power supplied to said circuit.

My invention may be understood more clearly by reference to the accompanying drawing, in which Fig. 1 is a vector diagram of the current and voltage conditions existing in the ordinary alternating-current load circuit, Fig. 2 is a diagrammatic illustration of the remote-metering system of my invention, and Fig. 3 is a similar illustration of a modification thereof.

Referring first to Fig. 2, a load circuit 10 is adapted to receive energy from any convenient source (not shown) for supplying any known type of load device which may be connected thereto. In order to obtain an indication of the power supplied to the circuit 10, I employ a plurality of transformers 11, 12, 13 and 14 which are adapted to be connected in such manner as to induce voltages in the secondary windings of the transformers 12, 13 and 14, which are proportional to the vector sum and difference of the current and voltage of the load circuit 10, as will be more fully explained hereafter.

It will be observed that the primary windings of the transformers 12 and 14 are connected in series with the lower half of the primary winding of the transformer 13 and a protective resistor 15 across the load circuit 10. The secondary winding of the current transformer 11 is connected in series with the primary windings of the transformers 12 and 14 and the upper half of the primary winding of the transformer 13. Assuming that the left-hand conductor of the circuit 10 is positive, at a given instant, with respect to the other conductor of said circuit, a current proportional to the voltage across the circuit 10 will flow from the left-hand conductor thereof, through the resistor 15, upwardly through the lower half of the primary winding of the transformer 13 and, through the primary windings of the transformers 14 and 12 in the same direction, to the right-hand conductor of the circuit 10.

Assuming further that the lower terminal of the secondary winding of the transformer 11 is positive at the same instant, a current proportional to the current in the circuit 10 will flow from the lower terminal of the secondary winding of the transformer 11 downwardly through the upper portion of the primary winding of the transformer 13 and upwardly, through the primary windings of the transformers 14 and 12, to the upper terminal of the secondary winding of the transformer 11.

It will be apparent from the foregoing that the flux induced in the cores of the transformers 12 and 14 is proportional to the vector sum of the current and the voltage of the circuit 10, while the flux induced in the core of the transformer 13 will be proportional to the vector difference of the same quantities. Proportional voltages will, obviously, be induced in the secondary windings of the transformers.

In order to convert the voltages across the secondary windings of the transformers 12, 13 and 14 to direct current, to make possible the transmission thereof for considerable distances, I employ a plurality of full wave-rectifiers 16, 17 and 18. These rectifiers, as illustrated, are of the copper-oxide disc type, although rectifiers of any other type may be utilized instead. The rectifiers 16, 17 and 18, regardless of the type employed, produce, at their direct-current terminals, voltages proportional to the voltages applied to the alternating-current terminals.

A direct-current wattmeter 19 of standard design is employed to indicate the power absorbed in the circuit 10. The meter 19 is provided with the usual windings 20 and 21. The winding 20 of the wattmeter 19 is adapted to be energized by a direct current proportional to the difference of the voltages existing across the direct-current terminals of the rectifiers 17 and 18. This will be apparent from tracing the circuit including the winding 20 of the meter 19 which extends through a filter 22, the function of which is well known, to the positive terminal of the rectifier 17, the negative terminal thereof, to the negative terminal of the rectifier 18, to the positive terminal thereof, to the other terminal of the winding 20. The rectifiers 17 and 18, obviously, are differentially connected in series with the winding 20.

The winding 21 of the meter 19 is connected, through a second filter 23, to the negative terminal of the rectifier 17, and the circuit extends to the positive terminal thereof, the negative terminal of the rectifier 16, the positive terminal thereof, to the other terminal of the winding 21. The winding 21 is thus energized by a current proportional to the sum of the voltages across the direct-current terminals of the rectifiers 16 and 17.

The wattmeter 19, having its windings energized, respectively, by currents proportional to the sum and the difference of the vector sum and the difference of the current and voltage of the circuit 10, indicates correctly the power absorbed by the circuit. This relation may be proved graphically, reference to Fig. 1, in the following manner—

By trigonometry,
$$b^2 = V^2 + I^2 + 2VI \cos c$$
$$a^2 = V^2 + I^2 - 2VI \cos c$$

subtracting,
$$b^2 - a^2 = 4VI \cos c = 4P$$

where $P = $ power.

Thus $(b-a)(b+a) = KP$, where $K = $ constant of calibration.

Since the transformers 12 and 14 are energized by the vector sum of currents proportional to the voltage and current of the circuit 10, the direct-current voltages of the rectifiers 16 and 18 are proportional to the vector $b$ of Fig. 1 which is the vector sum of the voltage $V$ and the current $I$. The transformer 13 similarly produces a voltage proportional to the vector difference of the voltage $V$ and the current $I$ which difference is represented graphically by the vector $a$. The direct-current voltages of the rectifiers 16 and 18 corresponding to the vector $b$, and that of the rectifier 17 corresponding to the vector $a$ are combined, as indicated above, and their sum and difference, respectively, applied to the windings 21 and 20 of the wattmeter 19. As is well known, the torque upon the moving element of a wattmeter is proportional to the product of the fluxes induced by the fixed and the moving coils so that the reading of the meter 19 is proportional to the product of $(b-a)$ and $(b+a)$ or $(b^2-a^2)$. As explained hereinbefore, this product is proportional to the power absorbed in the circuit 10.

In Fig. 3, I have employed transformers similar to those shown in Fig. 2 at 16, 17 and 18 except that the primary windings thereof are each divided into two portions. One-half of the primary winding of each transformer is connected in a circuit including the secondary winding of the current transformer 11. The other halves of the primary windings of the transformers are connected in series across the circuit 10 and are thus subject to the voltage thereof. Assuming the right-hand conductor of the circuit 10 to be positive at a given instant with respect to the other conductor, the lower portions of the primary windings of the transformers 16, 17 and 18 are energized by the current in a direction indicated by the arrows associated therewith. If the upper terminal of the current transformer 11 is positive at the same instant, the upper portions of the primary windings of the transformers will be traversed by a current in the direction which is also indicated by the arrows associated with the windings mentioned. It will be obvious that the flux induced in the coils of transformers 16 and 18, and consequently, the voltage induced in the secondaries thereof, will be proportional to the vector sum of the current traversing the circuit 10 and the voltage thereacross, while the voltage induced in the secondary winding of the transformer 17 will be proportional to the vector difference of these quantities.

In other respects, the system shown in Fig. 3 is identical with that of Fig. 2 and for that reason, a description thereof is not repeated.

It will be obvious that numerous advantages are inherent in the metering system which I have shown and described hereinabove. The principal of these is that no delay occurs between a change in the load on the circuit 10 and a corresponding change in the indication of the meter 19. All remote-metering systems of the prior art were characterized by a delay in the operation of the indicating meter, but the system of my invention avoids this disadvantage.

Other advantages will be apparent without specific mention thereof.

Although I have shown and described specific embodiments of my invention, it is to be understood that it may be altered and amplified in many particulars to meet various requirements. The system, for example, may be employed to measure reactive volt-amperes instead of power, by methods already known, utilizing a wattmeter and making appropriate connections thereto. It is also possible to accomplish this result by substituting a condenser for the resistor 15.

Various modifications may be made in my invention without departing from the spirit and scope thereof and I desire, therefore, that only such limitations shall be placed thereon as are imposed by the prior art and set forth in the appended claims.

I claim as my invention:

1. In combination, an alternating-current power circuit, a product meter for indicating the power supplied to said circuit and means for energizing said meter comprising current and voltage transformers associated with said circuit, rectifiers connected to said transformers adapted to supply direct currents proportional to the vector sum and difference of the current traversing said circuit and the voltage thereacross, a transmission circuit connecting said rectifiers and said meter whereby the windings of the latter are respectively energized by the sum and the difference of said direct currents.

2. In a metering system for indicating the power supplied to an electric circuit, in combination, a product meter, voltage transformers associated with said circuit disposed to produce voltages proportional to the vector sum and difference of the phase current traversing said circuit and the phase voltage thereacross, means for producing direct currents proportional to said voltages, and circuits for combining said currents and supplying the sum and the difference thereof respectively to the windings of said meter.

3. The combination with an electric circuit, transformers for obtaining voltages proportional to the vector sum and difference of the current traversing said circuit and the voltage thereacross, and means connected to the transformers for producing direct currents proportional to said voltages, of a product meter for indicating the power supplied to said circuit, and circuits for supplying the sum and the difference of said direct currents, respectively, to the windings of said meter.

4. A metering system for providing an indication of a characteristic of an electric circuit comprising means for obtaining voltages proportional to the vector sum and difference of the phase current traversing said circuit and the phase voltage thereacross, a direct-current product meter for indicating predetermined electrical characteristics of the circuit, and means for obtaining direct currents proportional to said voltages and supplying the sum and the difference of said currents, respectively, to the windings of said meter.

5. In a metering system, in combination, an alternating-current power circuit, a product meter for indicating the power flowing in the circuit, and means interposed between the meter and the power circuit for delivering uni-directional actuating currents to the meter which are a function of the vector sum and difference of the alternating current flowing in and the voltage across the power circuit thereby to cause the meter to indicate the power delivered by the circuit.

6. In a metering system, in combination, an alternating-current power circuit, a product meter for indicating the amount of power flowing in the circuit, means associated with the power circuit for developing voltages proportional to the vector sum and difference of the current and voltage of said power circuit, and means connecting the meter to said voltage-developing means for energizing the meter with direct currents proportional to the sum and difference of the voltages produced by the voltage-developing means.

7. In a metering system, in combination, an electric circuit, a direct-current product meter for indicating an electrical quantity of the circuit, a plurality of transformers connected to the circuit responsive to the phase current and voltage of the circuit, a plurality of rectifier devices connected to said transformers for supplying direct currents proportional to the voltages produced by the transformers, and a transmission circuit connecting said rectifier devices to the meter, said circuit being disposed to supply direct currents to the meter proportional to the sum and difference of the currents produced by the rectifier devices.

8. A metering system for providing an indication of an electrical quantity of an electric circuit comprising current and voltage transformers having their primary windings connected to the circuit in a predetermined manner to produce secondary voltages proportional to the vector sum and difference of the phase currents and voltages of the circuit, a direct-current meter for indicating the electrical quantity of the circuit and means including a plurality of rectifier devices for energizing the direct-current meter with direct currents proportional to the secondary voltages of the transformers.

In testimony whereof, I have hereunto subscribed my name this 27th day of March 1929.

BERNARD E. LENEHAN.